C. M. HECK.
METHOD AND APPARATUS FOR COMPARING SOUNDS.
APPLICATION FILED MAY 26, 1915.
1,356,359.
Patented Oct. 19, 1920.
4 SHEETS—SHEET 1.
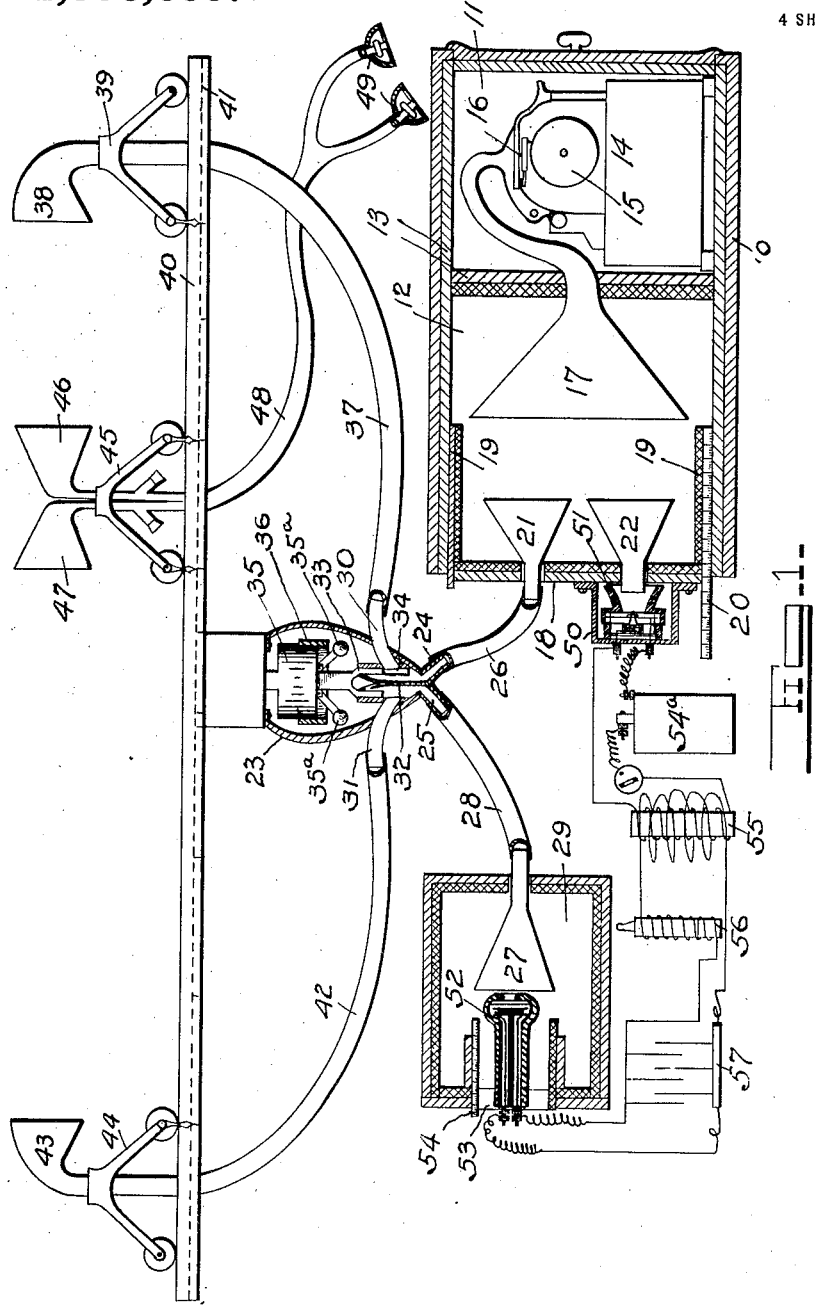
INVENTOR
Charles M. Heck
BY
Hodges & Hodges
ATTORNEYS

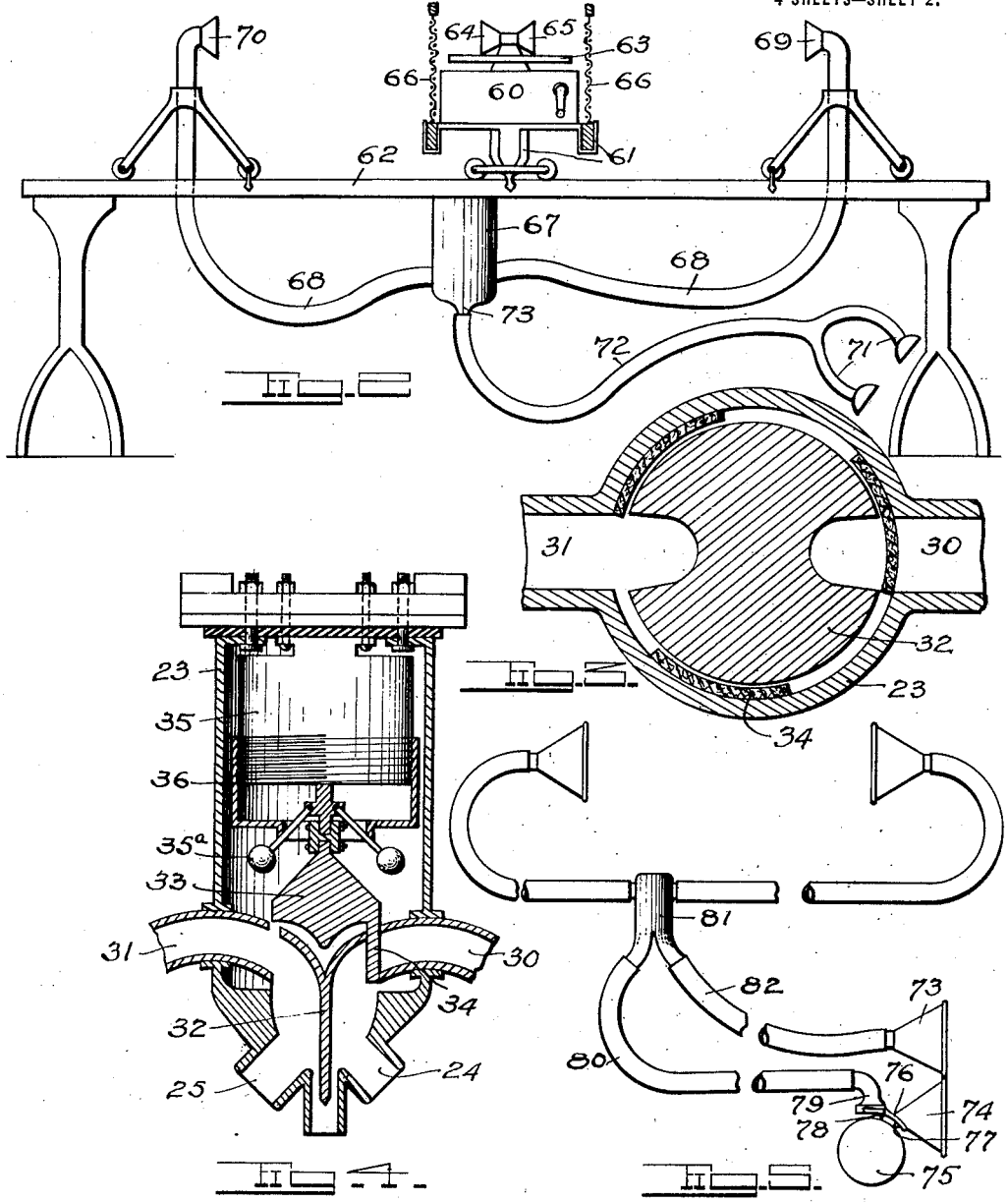

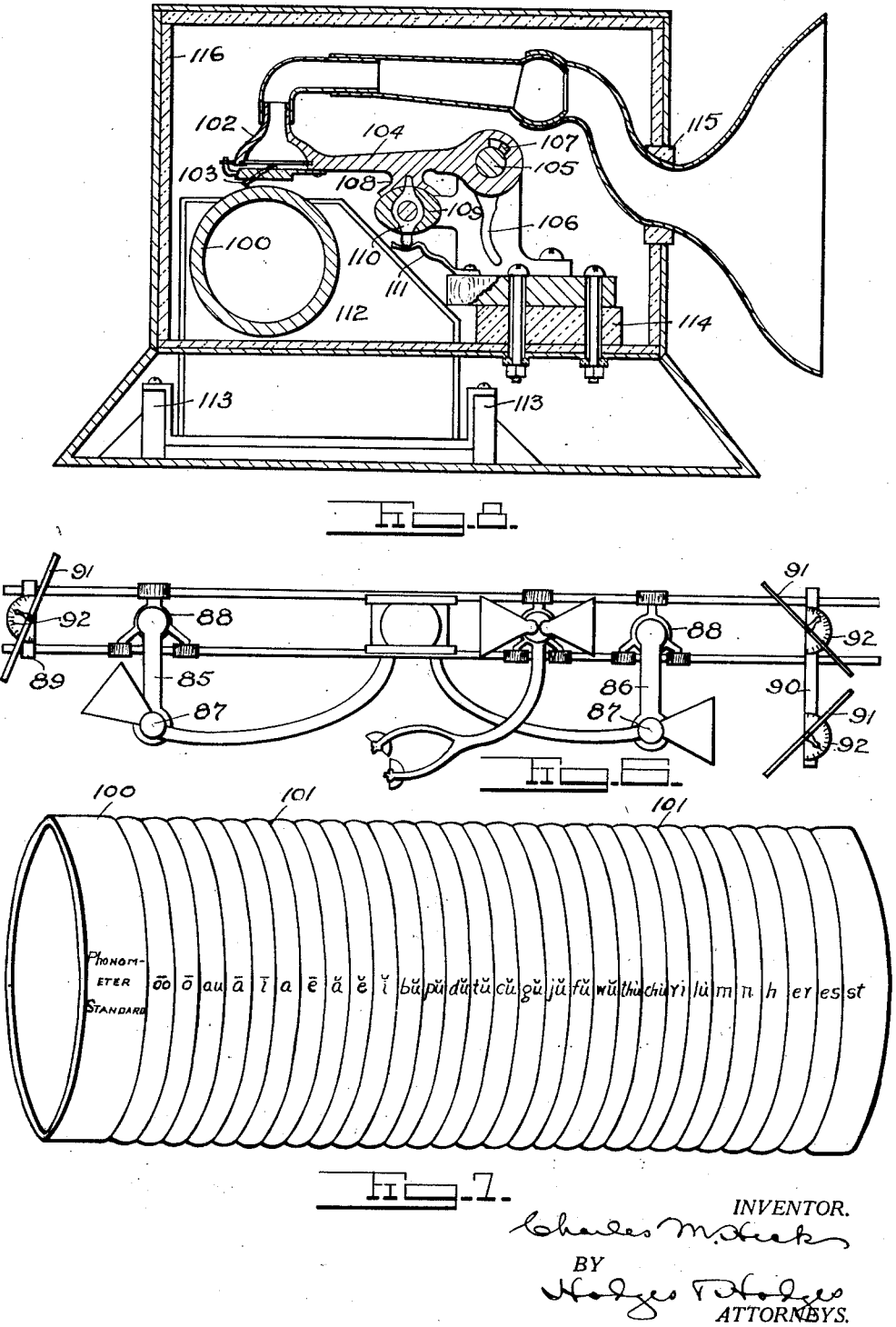

C. M. HECK.
METHOD AND APPARATUS FOR COMPARING SOUNDS.
APPLICATION FILED MAY 26, 1915.
1,356,359.
Patented Oct. 19, 1920.
4 SHEETS—SHEET 4.
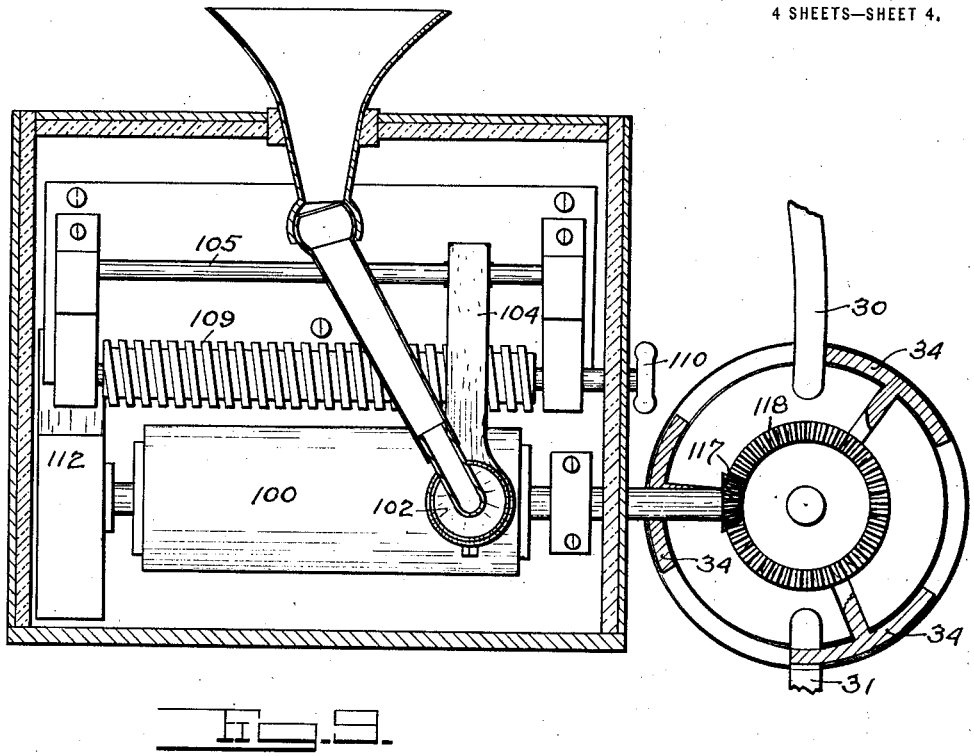
INVENTOR
Charles M. Heck
BY
Hodges & Hodges
ATTORNEYS

UNITED STATES PATENT OFFICE.

CHARLES M. HECK, OF RALEIGH, NORTH CAROLINA.

METHOD AND APPARATUS FOR COMPARING SOUNDS.

1,356,359.　　　　　Specification of Letters Patent.　　Patented Oct. 19, 1920.

Application filed May 26, 1915. Serial No. 30,648.

*To all whom it may concern:*

Be it known that I, CHARLES M. HECK, a citizen of the United States, residing at Raleigh, in the county of Wake and State of North Carolina, have invented new and useful Improvements in Methods and Apparatus for Comparing Sounds, of which the following is a specification.

This invention is a method and an apparatus for comparing sounds in such manner as to accurately determine the relative strength thereof.

It is well known that to measure the absolute strength of any force that is perceived by any one of the five senses, directly, such as sound or the like, has been one of the most difficult problems of science. The difficulty is found in the irregular action of the senses themselves. For example, when lights are weak the senses can detect the difference between two lights when their actual difference in strength may be as small as a hundredth of a candle power, whereas the same sense could not distinguish any difference between two strong lights, though their actual difference may be hundreds of candle power. Therefore, direct measurements by the sense of sight are of little value, and as a result of this condition ingenious methods and devices have been invented to overcome this weakness.

In measurements of sound, the sense of hearing shows a similar weakness, and efforts have been made to accomplish such measurements with mechanical vibrators, wherein the amplitude or energies of the vibration is observed without relying upon the ear. Nevertheless, the demand for simple and effective sound measurements has not been met heretofore, and one of the objects of the present invention is to produce means whereby the difficulties heretofore experienced by aural measurements of sound, are overcome.

The first requirement in any measurement by the senses, is rapidity of succession of the impressions to be compared. To hear one sound even for a longer period and then listen to another sound for a like period, is by no means as effective as to shorten the periods of observation and make them succeed each other, with a minimum time interval between the observations to be compared. A further object of the invention, therefore, is to provide means for periodically bringing to the ear, the sounds to be compared, one after the other, and to make the interval between the hearing of the two sounds as short as possible. A further object is to provide means of making the length of the periods that the two sounds are observed, equal, and to gradually increase that length of time, by almost imperceptible change, until the same is found to best suit the character of the sounds to be observed and the peculiarity of the observer.

A further requirement for accuracy in sound measurement relying on the sense of hearing, is continuity of intensity, that is to say the sources of sound are changed without having one sound cut out more than the other is cut in. The delicacy of detection of differences in sound intensity is immensely greater between weak sounds than between strong sounds, but experiment shows that if a stronger sound continues and is intermittently reinforced and decreased, such intermittent variation may be detected with nearly the same degree of accuracy that is found in the detection of the differences between weak sounds. One of the objects of the invention is to provide means for carrying out the principle, by making provision whereby the hearing is not directed to the sound itself, but to a pulsation in that sound. In other words, it is a "flicker" of the sound that is observed, very much in the same manner that flicker observations are made in connection with light measurements, to indicate that the system is out of balance.

A further object is to provide means for varying the relative lengths of the respective paths through which the sounds to be compared are caused to travel.

The invention will be hereinafter fully set forth and particularly pointed out in the claims.

In the accompanying drawings:—

Figure 1 is a diagrammatic view, partly in section of what I term a "flicker phonometer," parts being shown in section. Fig. 2 is a diagrammatic view of a modification thereof. Fig. 3 is a detail sectional view of the valve of the continuity device. Fig. 4 is a longitudinal sectional view of the valve and its operating mechanism, Fig. 5 is a view of a second modification of the flicker phonometer. Fig. 6 is a modification for reflection. Fig. 7 is a view of a sound standard. Figs. 8 and 9 are views of a reproducer for standard.

Referring to the drawings, 10 designates a casing or receptacle, divided into two compartments 11 and 12 respectively, the walls of which are provided with suitable sound insulating material 13. Within the chamber 10 is located a sound reproducing machine 14 provided with the record cylinder 15 and reproducing device 16 connected with an amplifying horn 17 located in the chamber 12. The record 15 may be provided with any suitable or desired sound record, but it is preferred to have the same consist of a succession of a plurality of enunciations or vocal sounds. The outer end of the chamber 12 is closed by a wall 18 mounted upon suitable guides 19 slidably engaging the side walls of the chamber, and provided with a scale bar 20, to indicate the distance of said wall from the delivery end of the horn 17. Attached to and supported by the end wall 18 are receiving cups 21 and 22.

Located conveniently with respect to the casing 10 is a valve casing 23 provided with nipples 24 and 25, the nipple 24 being connected with the receiving cup 21, by means of a tube 26, and the nipple 25 being connected to a receiving cup 27 by means of a tube 28, said receiving cup 27 being located within a chamber 29. Said casing is also provided with outlet nipples 30 and 31 respectively, and the passage of sound through the casing to said outlet nipples is controlled by a central partition 32 and a rotatable valve 33. Said valve is provided with a plurality, preferably three depending closure members 34, so arranged that when the outlet nipple 30 is closed, the outlet nipple 31 is open, and each nipple is closed in proportion as the other is opened. The valve 33 is rotated automatically by means of a suitable motor 35 conventionally illustrated, and the speed of rotation is adjustably controlled by means of centrifugal weights $35^a$, the movement of which is limited by an adjustable barrel 36 having threaded engagement with the casing of the motor. The nipple 30 is connected by a tube 37 with a delivery cup 38 supported by a carriage 39 mounted upon tracks 40, a scale bar 41 being placed on the outer face of one of said tracks, the carriage being provided with a suitable pointer coöperating with said scale. The nipple 31 is connected by means of a tube 42 with a similar delivery cup 43 also supported by a carriage 44. A carriage 45 is supported by the tracks 40 between the carriages 39 and 44, the same being provided with oppositely disposed receiving cups 46 and 47, connected by a tube 48 with ear cups 49. The receiving member is directed toward the cup 38, and the cup 47 is correspondingly directed toward the cup 43.

In Fig. 1 the invention is illustrated as employed for testing efficiency of telephonic apparatus.

Attached to the sliding partition 18 is a supporting chamber 50 for a telephone transmitter 51 located opposite the discharge orifice of cup 22, and a telephone receiver 52 is supported by a slide 53 within chamber 29. A suitable scale 54 is employed to indicate any adjustment of said support. The telephone transmitter is connected with the receiver by a suitable circuit including battery $54^a$, induction coil 55, inductive resistance 56 and condensers 57 to vary its operation.

The reproducing machine 14 is operated to successively produce predetermined sounds, such as notes or vowels, and these sounds are discharged from the horn 17 into the cups 21 and 22. The sound entering cup 21 passes through the valve casing, and is discharged by cup 38. The sound entering cup 22 passes through the transmitter 51 to the receiver 52, and from thence enters cup 27, passing through the valve casing and is delivered by the cup 43. By operating the valve, so as to rapidly open and close the passages to the cups 38 and 43, the observer receives the rapid pulsations, corresponding to a flicker in light, and by adjusting the carriage 45 so that the sounds enter cups 46 and 47, with approximately the same intensity, pulsations are prevented thereby indicating that the device is in balance. By then adjusting the parts to produce varying pulsations the operator is enabled to accurately determine any distortion or inaccuracy in the operation of the telephonic instruments and measure the relative intensity of reproduction.

In Fig. 2 a slight modification is provided which is somewhat the reverse of the structure above described. In this form of the invention a sound reproducing instrument 60 is supported upon a carriage 61, mounted on tracks 62 similar to the tracks 40. The sounds made by the record 63 are discharged through oppositely extending amplifying devices 64 and 65, screens 66 being placed adjacent thereto, to cause the sounds to pass therethrough. Supported in suitable manner by the tracks in a casing 67 containing a rotating valve similar to the valve 33, which is not illustrated in detail, and leading from suitable nipples extending from said casing are tubes 68 which cause sounds emanating from the sound reproducing mechanism 60, and entering the receiving cups 69 and 70, to pass to the casing 67, the ear pieces 71 being connected by a tube 72 with the nipple 73 of the casing 67. By adjusting the receiving cups 69 and 70 with respect to the cups 64 and 65, so that the observer gets the same intensity of sound from both, the distance between the cups will indicate the relative perfections of the respective amplifying devices.

In Fig. 5 is illustrated a modification similar to Fig. 1, except that in this form the instrument to be tested is a phonograph. The sound source may be an original or reproduced sound. From this source sounds pass into receiving cups 73 and 74. Sounds passing into 74 are recorded on a record blank 75 by phonograph recorder 76. Directly behind the recording stylus 77 is reproducing stylus 78 and sound box 79. Tube 80 leads from the reproducer to valve 81 of same construction as described above. Tube 89 in like manner connects receiving cup 73 with valve 79. The rest of the apparatus is the same as in Fig. 1.

In Fig. 6 is illustrated a modification similar to Fig. 1 whereby the reflecting qualities of various substances and the variations produced in the nature of sound reflected are determined. The modification consists in displacing the sound discharging cups relative to the track on which they are mounted, and, by one or more reflections bringing the sounds back into line with the track. Displacing arms 85 and 86 are adapted to replace the cup holds 87 in the carriage 88. 89 is a single and 90 a double reflector base adapted to be removably attached to the track 40. 91 are the rotating frames on which the substances to be tested are mounted and 92 are the scales indicating the angle of the frames with respect to the track. The rest of the apparatus is the same as in Fig. 1. In any of the described forms the source of the original sound may be voice or any other sound source. But for uniformity I have preferred any instrument reproducing a standard set of sounds whereby exact repetition is assured with fixed intensity. Figs. 7, 8 and 9 illustrate in detail the preferred mechanism employed when it is desired to accurately evaluate the reproducing qualities of an instrument. Fig. 7 illustrates a standard enunciation record and consists of a cylinder 100 with a series of grooves 101 encircling same in closed form. In each groove is recorded with maximum distinctness the vowels and characteristic consonant sounds as indicated. The surface between the grooves is inclined from the point midway between to the bottom of the grooves to direct the stylus into the groove. In Fig. 8 such a record appears in section with reproducing sound box 102 and stylus 103 of any desired form. The sound box is mounted on an arm 104 which is pivoted on a rod 105 along which it may slide a distance equal to the length of the record. By means of a grip 106 fixed to arm 104 said arm may be raised to the limiting key 107, disengaging the stylus from the record and allowing same to be moved to any desired point on the record. The connections between the sound box and amplifier may be of any suitable form. I have illustrated it as composed of the ball and socket and telescoping construction. The method of inserting the record cylinder may also be of any of the accustomed forms. A threaded foot 108 rests normally on an elliptical worm 109 having threads corresponding to the distance between grooves on the record. A key 110 at one end of worm 109 is used to operate the worm. For every half turn of the key and worm the stylus is elevated from contact and moved on to the next circular groove and let down to contact again. The spring 111 presses against said key to fix its operative position. The motor 112 and bearing for the record support are insulated from the casing by a frictional suspension system on rubber blocks at 113. The reproducing elements and supports are wholly separate from the rotating parts and insulated from the casing by rubber blocks 114 and 115. The casing is preferably lined with sound insulating material 116 and tightly closed when in operation, thereby producing a minimum of grating to dull the keenness of aural detection. A rotating valve, similar to that illustrated in Fig. 3, is employed, the same having depending closure members 34, as shown in said figure and Fig. 9. When it is desired that the rotating valve admit a finished enunciation alternately through two paths, means is provided whereby the sound source and valve may act synchronously. For this purpose I have illustrated in Fig. 9 the shaft bearing the record 100 as extending through the casing and provided with a beveled pinion 117 meshing with a gear 118, the valve being shown in horizontal section. In this method of sound comparison the flicker element would not ordinarily be used and the depending closure members 34 would be relatively large as compared to the outlet nipples 30 and 31. The pinion 117 and gear 118 have a ratio of 1 to 6, and three closure members are employed so arranged that upon one revolution of the record, one member 34 remains across the nipple 31, while the nipple 30 is simultaneously uncovered for a like period. The next revolution of the record closes the nipple 30 and opens nipple 31. Thus during one revolution of the record, sound will be conveyed from the reproducer to the observer, and during the next revolution, the same sound will be conveyed through the apparatus to be tested, to the observer.

In Fig. 1 sound discharging members, sending out the sounds in all directions equally, may be substituted for the directed dischargers shown. This would produce a fixed ratio of intensity to the distance from the discharging member, but would require the walls of the containing room to be heavily padded with ridged felt surface for accurate observations. With this phonometer one can evaluate definitely the reproducing ability of an instrument by means of observations while using the standard enunciation record described. These values are determined by the point on the phonometer track where the original and reproduced sounds give equal effect in the receiver. The numerical equivalent of intensity of the setting for each of the sounds on the record is noted and all such equivalents totaled or averaged. This may be taken as the standard evaluation of that instrument.

I claim as my invention:—

1. The method of comparing sounds which consists in alternately admitting the sounds to be compared to, and excluding them from a common point, and coördinating the admission and exclusion of the sounds, to control the relative lengths of each succeeding period of the exclusion of each sound from said common point.

2. The method of comparing sounds which consists in alternately admitting the sounds to be compared to, and excluding them from a common point, and controlling the ratio between the volumes of the admitted and excluded sounds during the time occupied in admitting one and excluding the other of said sounds.

3. The method of comparing sounds which consists in alternately admitting the sounds to be compared to, and excluding them from a common point, and relatively varying the intensity and volume of the sounds permitted to reach the common point. to prevent pulsation in the sound at the common point.

4. The method of comparing sounds which consists in causing them to travel through different paths to a common point, alternately admitting the sounds to be compared to, and excluding them from the said different paths, and relatively proportioning the lengths of said paths to said common point.

5. The method of comparing sounds emanating from different sources which consists in causing the sounds to travel different paths to a common point, maintaining the individuality of the sounds at said common point, varying the relative lengths of said paths, and causing said sounds to proceed from said common point as though originating at that point.

6. The method of comparing sounds which consists in causing the sounds to be compared to travel through different paths to a common point, alternately admitting said sounds to and excluding them from said common point, and coördinating the admission and exclusion of the sounds to control the time occupied in admitting one and excluding the other of said sounds.

7. The method of comparing sounds which consists in causing the sounds to be compared to travel through different paths to a common point, alternately admitting said sounds to, and excluding them from the said common point, and controlling the ratio between the volumes of the admitted and excluded sounds during the act of excluding one and admitting the other of said sounds each time.

8. The method of comparing sounds which consists in causing the sounds to be compared to be successively admitted to and excluded from a common point, and controlling each successive admission and exclusion of the sounds with respect to said common point so as to cause each of the sounds admitted to said common point to be in predetermined proportion to each sound simultaneously excluded during each act of changing from one sound to another.

9. The method of comparing sounds which consists in alternately and successively admitting said sounds to, and excluding them from a common point in rapid succession, and relatively varying the nature of the sounds permitted to reach the common point until pulsation in the sound at the common point is eliminated.

10. The method of comparing sounds which consists in causing the sounds to be compared to travel through different paths to a common point, and alternately admitting the sounds to, and excluding them from said common point in rapid succession, and varying the relative paths of said sounds to decrease pulsation.

11. The method of comparing sounds which consists in successively causing the sounds to be compared to travel through different paths to a common point, maintaining the individuality of the sounds at said point, and varying the nature of said paths to vary the difference in nature between said sounds at said point.

12. The method of comparing sounds which consists in conducting sounds to a point of observation, causing the sounds to be observed in rapid succession and effecting relative adjustment of the intensity of said sounds until they are of uniform intensity.

13. The method of comparing sounds which consists in causing the sounds to be observed in rapid succession and effecting relative adjustment of the intensity of said sounds until they are of uniform intensity.

In testimony whereof I have hereunto set my hand in presence of two subscribing witnesses.

CHARLES M. HECK.

Witnesses:
C. A. GOSNEY,
A. T. SHAW.